United States Patent [19]

Dunford et al.

[11] Patent Number: 5,022,660
[45] Date of Patent: Jun. 11, 1991

[54] LANTERN RING COIL

[76] Inventors: Joseph R. Dunford, 88 Ridge Ave., Waverley, Nova Scotia, Canada, B0N 2S0; George Champlin, 218 Green St., Stoneham, Mass. 02180; Milton Sylvia, R.R. #2, Lyn, Ontario, Canada, K0E 1M0

[21] Appl. No.: 443,361

[22] Filed: Nov. 30, 1989

[51] Int. Cl.$^5$ .............................................. F16J 15/18
[52] U.S. Cl. ........................................ 277/9; 277/59; 277/69; 277/203; 277/215
[58] Field of Search .......................... 277/9, 9.5, 11, 22, 277/59, 68, 69, 71, 72 R, 75, 105, 110, 112, 187, 200, 201, 202, 203, 215

[56] References Cited

U.S. PATENT DOCUMENTS

| 324,884 | 8/1885 | Reynolds et al. | 277/69 |
|---|---|---|---|
| 454,384 | 6/1891 | Rogers | 277/69 X |
| 501,207 | 7/1893 | Gingras . | |
| 567,233 | 9/1896 | Gruber | 277/203 |
| 1,313,192 | 8/1919 | Kee . | |
| 1,532,961 | 4/1924 | Travers . | |
| 1,653,439 | 12/1927 | Payne . | |
| 2,321,927 | 6/1943 | McCoy et al. | 277/105 X |
| 3,101,199 | 8/1963 | Hartnagel | 277/69 X |
| 3,601,416 | 8/1971 | Coran | 277/203 X |
| 3,834,715 | 9/1974 | Butler | 277/59 X |
| 3,910,428 | 10/1975 | Peterson, II | 277/22 X |
| 4,137,833 | 4/1979 | Yelloz . | |
| 4,239,245 | 12/1980 | Giglio et al. | 277/203 |
| 4,270,760 | 6/1981 | Greiman | 277/72 R X |
| 4,386,782 | 6/1983 | Reverberi | 277/59 |
| 4,498,681 | 2/1985 | Heinz . | |
| 4,570,942 | 2/1986 | Diehl et al. | 277/105 X |

FOREIGN PATENT DOCUMENTS

| 5287 | of 1885 | United Kingdom | 277/59 |
|---|---|---|---|
| 23138 | of 1902 | United Kingdom | 277/59 |

Primary Examiner—Allan N. Shoap
Assistant Examiner—Scott Cummings
Attorney, Agent, or Firm—Jones, Tullar & Cooper

[57] ABSTRACT

A length of plastic material may be formed into a helix and lantern rings may be cut therefrom for utilization with conventional packing adjacent a shaft in rotating or reciprocating equipment. The material exhibits a generally H-shaped cross-section defined by continuous side walls extending between radially inner and outer edges. Radially inner and outer surfaces are spaced inwardly from the inner and outer edges respectively. A plurality of generally radially extending holes pass from the outer surface to the inner surface and are spaced apart along the length of the material. These holes are utilized for the passage of cooling and lubricating fluid to the rotating shaft. Also, a plurality of generally axially extending holes pass from one side wall to the other and are spaced apart along the length of the material. These holes are utilized for extraction of a lantern ring from a stuffing box should the necessity arise. Several methods are also disclosed for producing the aforementioned product.

9 Claims, 3 Drawing Sheets

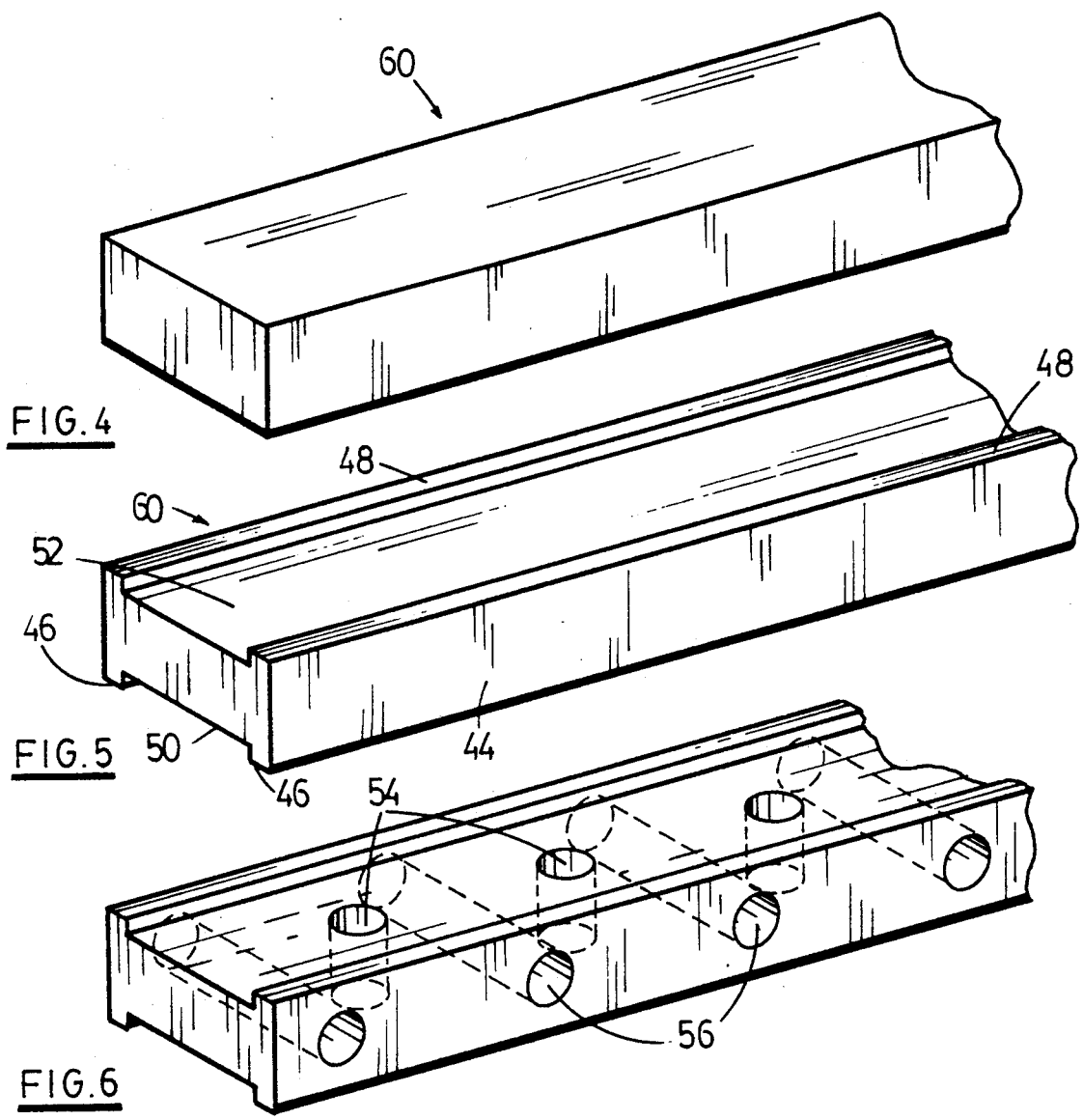
FIG.4
FIG.5
FIG.6
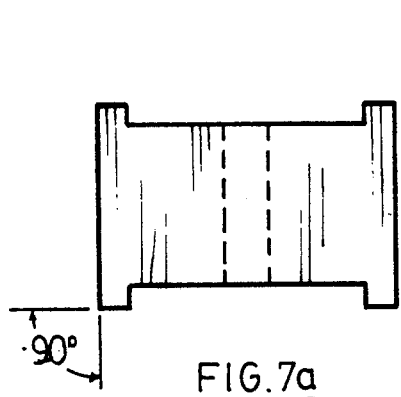
FIG.7a
(PRIOR ART)
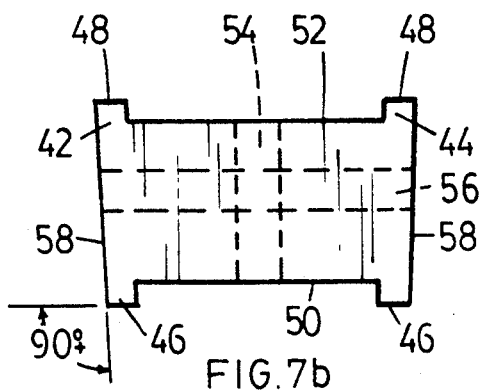
FIG.7b

LANTERN RING COIL

The present invention relates to a lantern ring or seal cage which is placed in a packing cavity of rotating or reciprocating equipment. The purpose of a lantern ring is to distribute cooling and lubricating fluid under the packing.

BACKGROUND OF THE INVENTION

Lantern rings for use with packing in rotating or reciprocating equipment are well known. Many issued patents relate to packing, to lubricating and cooling fluid distribution and to lantern rings. For example, U.S. Pat. No. 1,532,961 discloses a rod and stem packing with inner grooves or slots disposed therein for supplying a lubricant to the rod or shaft. U.S. Pat. No. 501,207 shows a washer having slits on its outer periphery so as to form individual washers. U.S. Pat. No. 4,137,833 shows a sealing ring with diameter indicia that enable it to be cut to proper lengths in the field without the use of a mandrel. U.S. Pat. No. 1,313,192 discloses a piston rod packing which is provided with V-shaped slots and comes in coiled form which may be cut to suitable lengths to fit different sized shafts. U.S. Pat. No. 1,653,439 illustrates a packing which may be cut to any suitable length and which may be bent into a selected form. U.S. Pat. No. 4,498,681 discloses a method of making lantern ring material in extended lengths from which the desired length for a specific application can be cut. In order to achieve sufficient flexibility to wrap the length around a shaft the patentee cuts slots across the width and through most of the body of the device. The resulting weakness of such a lantern ring has, however, caused severe problems with breakage and with removal of the device from the machine. In fact, removal of a lantern ring is one of the major problems associated therewith.

SUMMARY OF THE INVENTION

The present invention is intended to overcome the problems associated with conventional packing and lantern ring assemblies. Such problems are overcome with the present invention by providing a length of plastic material formed into a helical configuration from which shorter portions may be cut for use as a lantern ring adjacent a shaft in rotating equipment. The helical nature of the material of the present invention guarantees a certain degree of flexibility in the cut lantern rings such that individual rings cut from the helix may be hand-formed to fit around all standard shaft sizes. The lantern ring material of this invention will have a cross-section approximately the same as standard lantern ring material, namely a cross-section which is generally H-shaped. That cross-section is defined by continuous axially spaced side walls extending between radially inner and outer edges of the helix and by radially inner and outer surfaces spaced inwardly from the inner and outer edges respectively. The lantern ring material of the present invention is not axially slotted or cut and a ring formed therefrom will essentially conform to the outside of a stuffing box and will not be prone to contact the rotating shaft.

The distribution of cooling and lubricating fluid is guaranteed by a plurality of generally radially extending holes which pass from the outer surface to the inner surface of the material, which holes are spaced apart along the length of the material. Furthermore, in order to aid in removal of a lantern ring from the stuffing box the present invention provides for a plurality of generally axially-extending holes passing from one side wall to the other side wall and spaced apart along the length of the material. Such axially-extending holes are positioned between pairs of the radially extending holes. Because the lantern ring made from the helix of the present invention has essentially a solid body, there are no fracture points therein, such as are created by the slots of U.S. Pat. No. 4,498,681.

Helical material in accordance with present invention can be manufactured by at least three methods. For example, it would be possible to extrude a generally rectangular length of the material, to machine the material to the desired cross-sectional configuration, to drill the axially and radially extending holes through the material and to then feed the material through appropriately-shaped dies to create the desired helix. Alternatively, the H-shaped cross-section could be initially extruded so as to do away with the machining steps. Such an extruded length of material could then also be formed in the dies into the desired helical shape. As a final alternative the material of the present invention could be initially extruded directly into a helical configuration with the axial and radial holes introduced or created in the material following such extrusion.

A modification to the conventional lantern ring cross-section would involve having the side walls of the material converge inwardly from the outer edges to the inner edges thereof. With such walls, the axial pressure exerted by the packing system with which the lantern ring is used would force the ring radially outwardly away from the rotating shaft to prevent shaft damage due to contact with the ring.

The present invention will be described in greater detail hereinafter and with reference to the accompanying drawings.

BRIEF DESCRIPTION OF THE DRAWINGS

FIG. 4 shows a straight rectangular extrusion of material in accordance with the first production method for this invention.

FIG. 5 illustrates the extrusion of FIG. 4 following machining to the conventional lantern ring cross-section.

FIG. 6 shows the material of FIG. 5 following the drilling of both radial and axial holes therein.

FIG. 7a shows the cross-section of a conventional lantern ring.

FIG. 7b shows a cross-section of lantern ring material in accordance with this invention and having converging side wall surfaces.

DESCRIPTION OF THE PREFERRED EMBODIMENT

Figure 1:
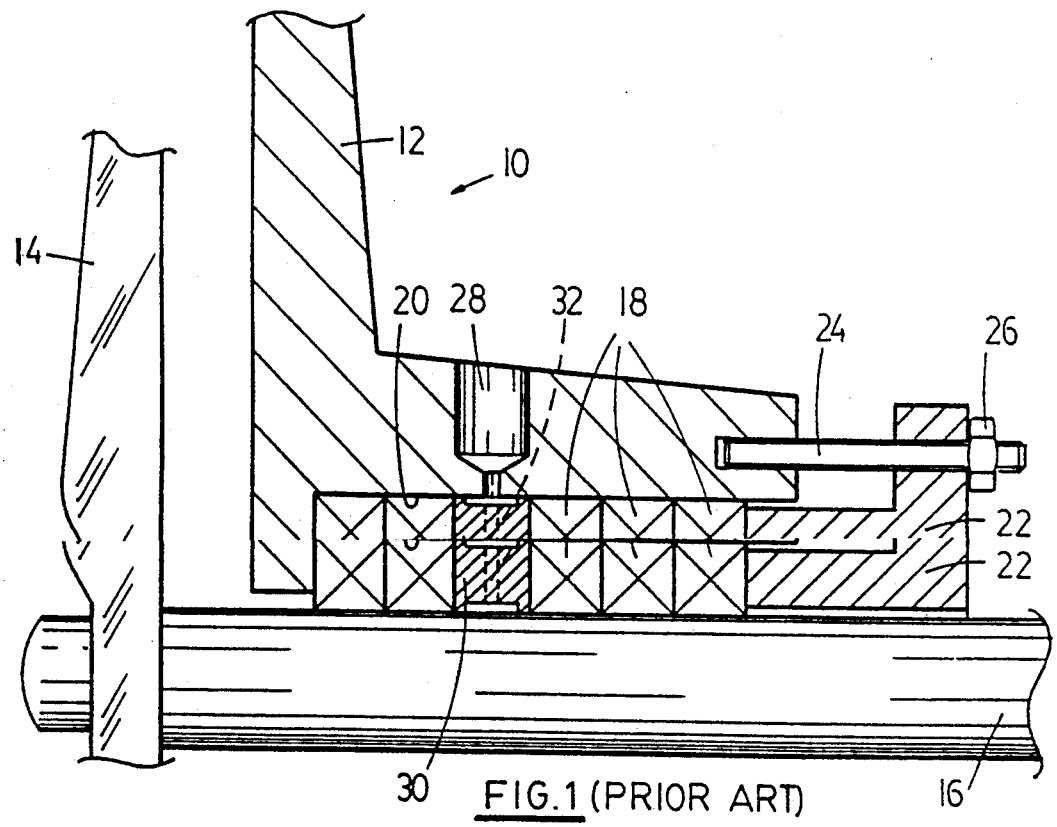
FIG. 1 shows a partial cross-section of a conventional stuffing box for rotating equipment illustrating a lantern ring in association with a plurality of packing rings.
Figure 9:
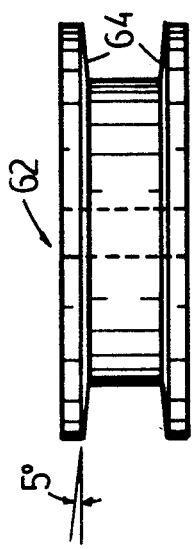
FIGS. 9 and 10 show the configuration of the die and roller used in the apparatus of FIG. 8.

FIG. 1 shows a conventional stuffing box configuration for rotating equipment. Such equipment might constitute, for example, a centrifugal pump 10 having a fixed housing or casing 12, a rotating impeller 14 and a rotating shaft 16. Lubrication and support for the shaft is provided by conventional packing rings 18 which surround the shaft in a packing cavity 20. The packing rings are held in position by an annular gland 22 which is attached to the housing 12 by a plurality of circumferentially spaced bolts 24 and adjustment nuts 26.

Conventionally, water is utilized for cooling and lubrication purposes, the water being introduced into the cavity 20 through a port 28, which port communicates with a conventional lantern ring 30. Such lantern ring might, conventionally, be configured as shown in U.S. Pat. No. 4,498,681. The lantern ring has radially directed holes or openings 32 therethrough through which cooling water may pass for distribution around the shaft and in the vicinity of the packing rings 18.

Figure 2:
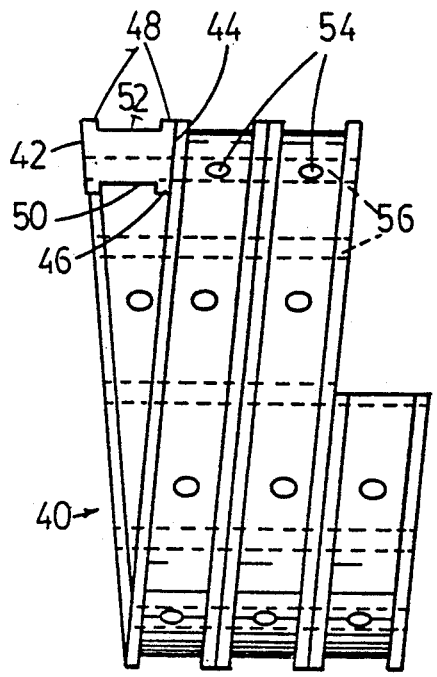
FIG. 2 shows a side view of a helical length of lantern ring material in accordance with the present invention.
Figure 3:
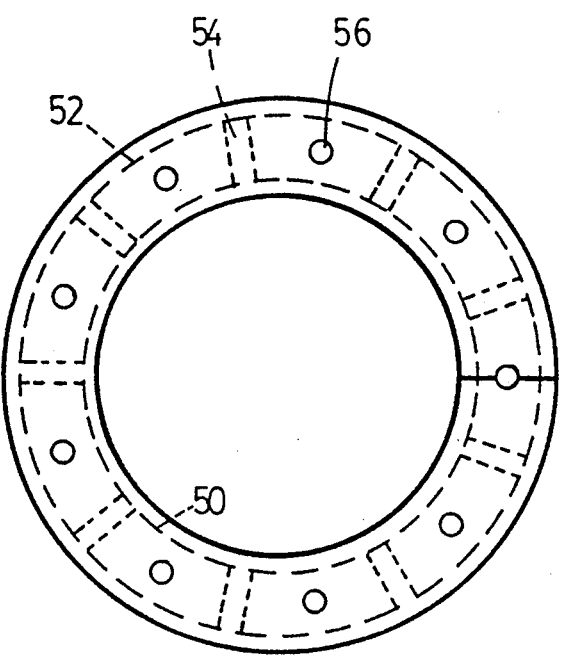
FIG. 3 shows an end view of the helical coil illustrated in FIG. 1.

As indicated previously the present invention provides for improved material from which lantern rings may be produced. With reference now to FIGS. 2 and 3 it will be seen that the present invention provides a length of material 40 which is formed into a helical shape. The material 40 has axially spaced apart side surfaces 42,44 extending between radially inner edges 46 and radially outer edges 48. A radially inner surface 50 is spaced inwardly from the inner edges 46 and a radially outer surface 52 is spaced inwardly from the radially outer edges 48. As seen in FIG. 2, for example, the resulting cross-section of the length of helical material is generally of an "H"-shape. Also as seen in FIG. 2 axially adjacent side walls of the material will abut against each other throughout the length of the helix.

The distribution of cooling and lubricating fluid is ensured by a plurality of generally radially extending holes 54 which pass through the material of the helical coil from the outer surface 52 to the inner surface 50. These holes are spaced apart along the length of the helix and are positioned generally centrally of the surfaces 50,52.

In order to facilitate the removal of a length of lantern ring material from a stuffing box the present invention provides a plurality of axially extended holes 56 which extend from one side wall 42 of the material to the opposite side wall 44 thereof. The holes 56 are also spaced apart along the length of the material. In order to ensure that there is no undue weakening of the material the holes 56 are positioned between pairs of the holes 54. Although the present invention illustrates alternating holes 54,56, it would not necessarily be essential to provide a hole 56 between each pair of holes 54. Depending on the circumference of the lantern ring it might be sufficient to have two or three radially extending holes 54 between successive holes 56. The holes 56 permit the introduction of removal tools and the rapid extraction of the complete lantern ring from a stuffing box.

With reference now to FIGS. 7 it will be seen that in FIG. 7a the cross-section of a conventional lantern ring is shown. That cross-section is not unlike the cross-section illustrated for the present invention in FIG. 2, being generally of a H-shape. In FIG. 7b, however, there is shown an improvement on the conventional cross-section wherein the outer surfaces 58 of the side walls 42,44 converge inwardly from the outer edges 48 to the inner edges 46. A contained convergence angle of 5° to 10° is preferred. When a lantern ring having the cross-section illustrated in FIG. 7b is utilized in a stuffing box such as is shown in FIG. 1 then the axial forces placed thereon by the packing rings 18, under the influence of gland 22, will tend to force the lantern ring radially outwardly so as to prevent contact between the shaft surface and the inner edges 46. This of course will help extend the life of the lantern ring and will avoid damage to the shaft itself.

Reference may now be had to FIGS. 4, 5, 6, 8, 9 and 10 for a preferred method of manufacturing the material of this invention.

FIG. 4 illustrates a strip of flexible raw material extruded in a very basic rectangular cross-section from conventional extruding equipment. The material utilized is preferably a material such as polytetrafluoroethylene. The strip of material 60 shown in FIG. 1 will have a width approximately equal to the width of the desired lantern ring material and a height approximately equal to the height of the side walls 42,44. The material 60 is then machined in conventional machining equipment to the desired H-shaped cross-section shown in FIG. 5. Then, by utilizing conventional drilling techniques the radially extending holes 54 and the axially extending holes 56 are drilled through the extruded material. It is of course noted that the material is straight as shown in FIG. 6 and the terms "radially-extending" and "axially-extending" are utilized for the sake of convenience inasmuch as the product as sold to the consumer will be in a helical configuration as shown in FIG. 2.

Figure 8:
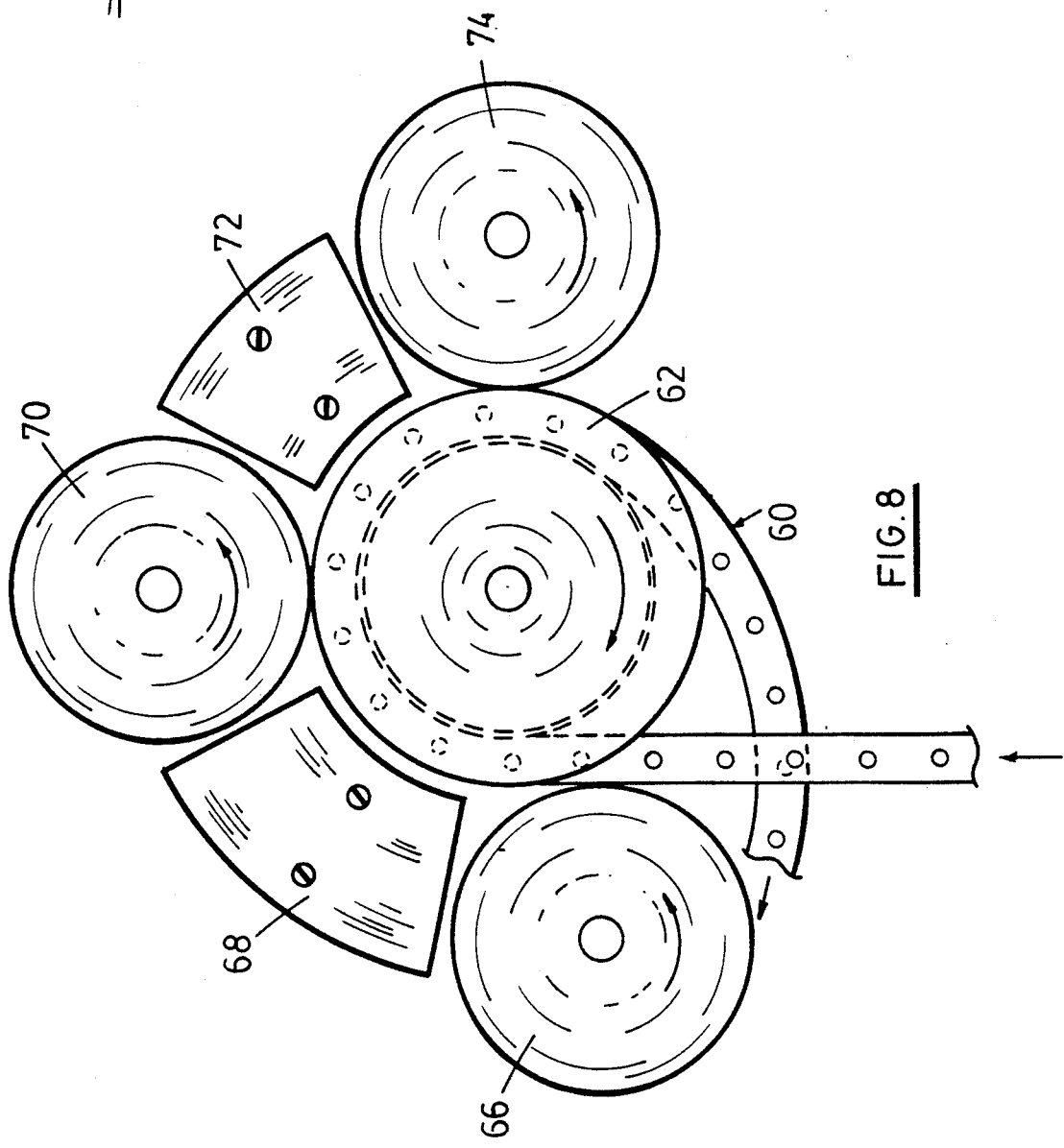
FIG. 8 illustrates schematically a machine utilized in creating the helical configuration illustrated in FIG. 2.

Turning now to FIG. 8 there is schematically illustrated a machine which is utilized to die form the straight material 60 into the helical coil 40 as illustrated in FIG. 2. The machine includes a central rotatable die 62 having, preferably, the configuration shown in FIG. 7. Therein it is seen that the die 62 is circular in nature and looks not unlike a pulley. The inner annular side walls 64 of the die are formed to the desired configuration of the side wall surfaces 58. In the embodiment as shown those side walls have a total convergence of about 10° (5° per side) and during die forming of the helix the converging side wall configuration of FIG. 7b will be formed.

Figure 10:
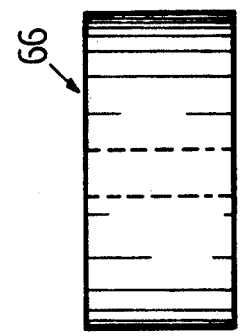

The material 60 is fed into the die past a cylindrical roller 66 (see FIG. 10). A guide 68 helps retain the material in the die 62 and it is further compressed into the die by a second cylindrical roller 70. Another guide 72 helps contain the material in the die and a third cylindrical roller 74 applies further pressure to the material itself. As the material passes from the die it will expand somewhat radially outwardly although the final configuration will be a helix as shown in FIG. 2.

The converging side walls 58 help ensure that the product will retain the desired helical configuration. The shaping of the side walls in the die 62 results in a cold-flow of the material through compression.

Lantern rings cut from a helical coil 40 retain a very high strength compared to prior art lantern rings. This strength, however, has one drawback in that it is physically difficult to compress the ring to a smaller diameter than that of the helical coil. On the other hand, it is relatively easy to stretch a ring to a larger diameter and accordingly in the forming process the helical coil is desirably formed to an inside diameter which is close to the smallest diameter shaft for which the cut lantern rings are meant to be used.

Also, during the forming process the material of the helical coil has a tendency to stretch radially at the location of the axial and radial holes. If those holes are spaced too far apart it is possible that flats will occur on the inside diameter of the coil. Such flats would interfere with proper fit and operation of the lantern ring cut from the helical coil and should be avoided if possible. It is possible with very little experimentation to arrive at an optimum spacing for any particular diameter of helical coils such that a smooth circular configuration can be obtained without affecting the strength of the finished product. For example, on a helical coil on which lantern rings are to be cut for use with one-half inch cross-section mechanical packings, the optimum spacing between holes has been found to be about three-quarters of an inch from center to center thereof.

As an alternative to the method just described hereinabove it would be possible to directly extrude the cross-section illustrated in FIG. 5, or even that shown in FIG. 7b, prior to the drilling and die forming steps. Another alterative method would involve the direct extrusion of material into the proposed helical configuration. Although this technique eliminates the need to die form the straight strips into the helical shape it does have the disadvantage of making the process of machining to size and the drilling of the radial and axial holes somewhat more difficult. Conventional engineering practices, of course, can be utilized to overcome such disadvantages. Also, with direct helical extrusion the tendency of the final product to spring radially outwardly is lost to some extent and the cut lantern ring does not expand quite as readily into the bore of the stuffing box. Thus with the direct helical extrusion process it is even more desirable to utilize the angled or converging side wall surfaces 58 so that the packing will tend to force the lantern ring radially outwardly within the stuffing box. Also, with the direct extrusion technique the helical coil should be formed to a slightly larger diameter than with the die forming technique since the end product is easier to form into a smaller diameter than to a larger diameter.

It can be seen now that the present invention provides an improved length of material from which lantern rings can be made. The material is relatively easy to manufacture, it does not have any stress or fracture points therein, it is easy to remove from a stuffing box should the necessity arise through the use of the axially extending holes, and if it is produced with the angled side walls there is less tendency for the inner edges thereof to contact the rotating shaft.

The foregoing has described a preferred embodiment of the present invention and preferred methods of manufacture thereof. It is of course expected that a person skilled in the art could alter the configuration as described herein without departing significantly from the spirit of the invention. For example, although the preferred material has been indicated as being polytetrafluoroethylene it is also conceivable that other plastic materials such as nylon, polypropylene and polyethylene could be utilized to advantage. Accordingly, the scope of protection to be afforded this invention is to be determined from the claims appended hereto.

The embodiments of the invention in which an exclusive property or privilege is claimed are defined as follows:

1. A length of plastic material formed into a helix and from which a shorter portion may be cut for use as a lantern ring adjacent a shaft in rotating or reciprocating equipment, said material having: a generally H-shaped cross-section defined by continuous axially spaced side walls extending between radially inner and outer edges thereof and by radially inner and outer surfaces spaced inwardly from the inner and outer edges respectively; a plurality of generally radially extending holes passing through said material between said outer surface and said inner surface and spaced apart along said length of material; and a plurality of generally axially extending holes passing through said material between one side wall and the other side wall and spaced apart along said length of material, each such axially extending hole being generally centrally located between adjacent pairs of said radially extending holes.

2. The length of material as defined in claim 1 wherein the inner diameter of the helix as defined by the inner edges of said side walls is approximately equal to the smallest diameter shaft with which a lantern ring made therefrom is to be used.

3. The length of material as defined in claim 2 wherein said side walls have axially spaced apart surfaces that converge from said outer edges to said inner edges.

4. The length of material as defined in claim 1, wherein an axially extending hole is provided between each pair of said radially extending holes.

5. The length of material as defined in claim 1, wherein said axially spaced side walls have corresponding surfaces that converge from said outer edges to said inner edges at an angle of convergence of about 10°.

6. The length of material as defined in claim 1, wherein said radially extending holes are positioned generally centrally of said inner and outer surfaces.

7. The length of material as defined in claim 1, wherein said generally axially extending holes extend through said material between said inner and outer surfaces.

8. The length of material as defined in claim 7, wherein said radially extending holes are positioned generally centrally of said inner and outer surfaces.

9. The length of material as defined in claim 7, wherein an axially extending hole is provided between each pair of said radially extending holes.

* * * * *